Jan. 5, 1943.                        E. SHEA                        2,307,163

VERMIN TRAP

Filed July 15, 1941

INVENTOR
Evan Shea
BY
Harry Radzinsky
ATTORNEY

Patented Jan. 5, 1943

2,307,163

UNITED STATES PATENT OFFICE 2,307,163

VERMIN TRAP

Evan Shea, New York, N. Y.

Application July 15, 1941, Serial No. 402,480

5 Claims. (Cl. 43—112)

This invention relates to vermin traps and more particularly to those of the type employed for catching small bugs or insects such as roaches, ants, waterbugs, bedbugs, or the like, although as will be apparent from the description hereinafter set forth, the device may also be effectively used for small animals.

Most efforts heretofore made for the destruction of insect pests have consisted in the placement or distribution of powdered or liquid poisons on which the insects feed. Such poisons are messy, are unsightly when spread around the home, and often contaminate food, and poison household pets. The primary object therefore, of the present invention, is to provide a trap, particularly useful in the home or outdoors, by which insects can be easily trapped, without the necessity of spreading poisonous materials about; which will conveniently collect the trapped insects and permit of their ready disposal, and which can be economically constructed and sold.

More particularly, the invention contemplates the provision of an enclosure having an entrance opening through which the insects enter, said opening being provided with means for imparting an electric shock to the entering insect to thereby cause it to fall into the enclosure, said shock-imparting means being also so constructed and situated that the same will impart an electric shock to any insect endeavoring to leave the enclosure through the entrance opening so that exit by the trapped insects therefrom is impossible.

Figure 1:
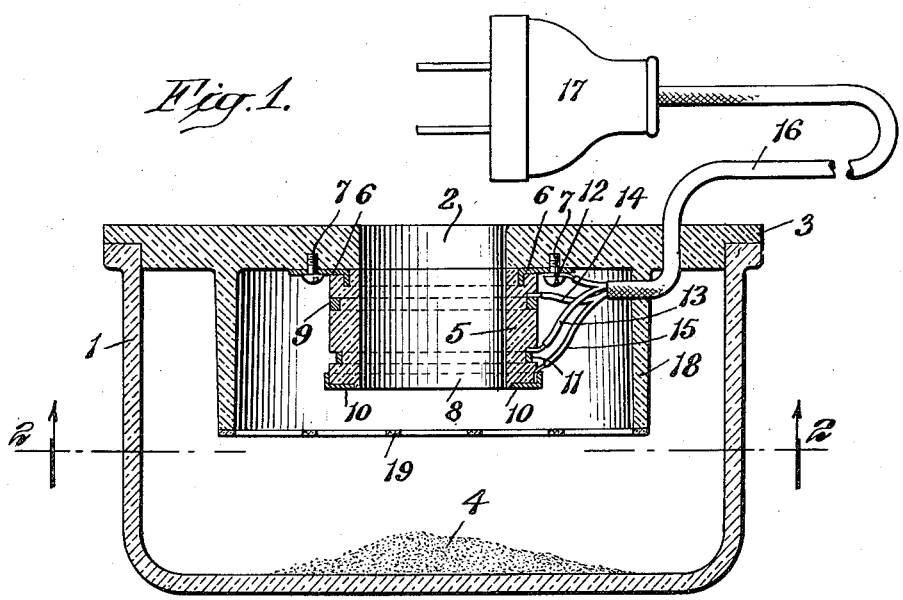
Figure 2:
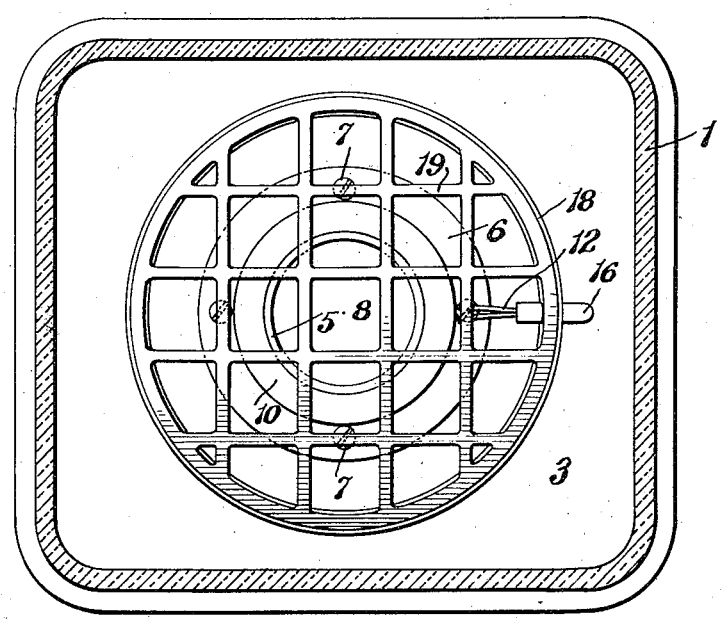

In the accompanying drawing, Fig. 1 is a vertical sectional view through a trap constructed in accordance with the invention; and Fig. 2 is a sectional view on the line 2—2 of Fig. 1, looking in the direction of the arrows.

In the drawing, 1 indicates the body of the trap which may be made in any suitable shape and is in the form of a receptacle into which the insects fall and are collected, after they have passed through the entrance opening 2 located in the cover 3. The receptacle 1 may be made of any suitable insulating material such as moulded plastic, Bakelite, glass or the like. The cover 3 is of a shape to snugly fit on the top of the receptacle. Said cover 3 is formed with a central entrance opening or hole 2 through which the insects crawl and to which they may be attracted by means of food or other material 4 placed within the receptacle.

Secured to the inner face of the cover 3 is a ring or annulus 5 composed of insulated material, said annulus 5 being provided with an embedded, radially extending, metal flange 6, constituting an electrode, the flange 6 being attached to the cover 3 by means of the screws 7, or other suitable fastening means, said screws serving to hold the annulus or ring 5 attached to the inside face of the cover. The annulus or ring 5 is formed with a central opening 8 registering with that indicated at 2 in the cover 3 and constituting a continuation of the opening 2. Spaced from the annular flange 6 is an annular metal electrode 9 embedded in the annulus 5. The inner end of the annulus 5 is provided with an annular metal electrode 10 extending over a portion of the inner end of the annulus 5 and over a part of the periphery of said annulus. Spaced a short distance therefrom is another annular electrode 11 which is embedded in the annulus 5 and has its outer face located slightly below the annulus 5 for a purpose to be hereinafter explained. The electrical connections for the several electrodes will be seen in Fig. 1 where it will be noted that one side of the electric power line connects at 12 and 13 to the electrodes 6 and 11 respectively, while the other side of the power line connects at 14 and 15 to the respective electrodes 9 and 10. In other words, the electrodes indicated at 6 and 11 may be both connected to the positive side of the line and the electrodes 9 and 10 connected to the negative side, or vice versa. The cable 16 carrying the electric current to the several electrodes may be connected to the conventional outlet by means of the usual connection plug 17.

From the foregoing, the operation of the device will be readily understood. Insects attracted by the food 4 within the receptacle 1, or by any other attracting means, will crawl over the top surface of the cover 3 and enter through the entrance opening 2, crawling around and over the inner end of the annulus 5. When the body of an insect bridges the electrodes 10 and 11, it will establish electrical connection between the negative and positive sides of the power line and will receive a shock sufficient to cause it to fall into the receptacle 1. Some insects, such as roaches, are provided with feelers which could enable them to detect the electric current by contact with the feelers and retreat in time to save themselves. For this reason, the electrode 11 is embedded below the surface of the annulus 5 so that the feelers of such insects will pass over it and the shock will not be imparted to the insect until its feet touch the electrode 11.

Insects falling into the receptacle and making an effort to exit through the registered apertures 8 and 2 will bridge the electrodes 6 and 9 and receive a shock therefrom causing them to drop back into the receptacle. It will thus be clear that I have provided two pairs of electrodes, one pair of which will impart a shock to the insects upon entry into the trap, and the other pair imparting a shock as they attempt to leave. Thus, when the insects are once caught in the trap they cannot leave the same. Insect poisons or other insect-killing or retaining material may be placed in the trap to kill the insects that are caught therein.

In order to protect the user of the device from electric shock, an annular protecting wall 18 is provided on the inside of the cover 3, said wall extending around and enclosing the annulus 5 and the electrodes carried thereby, so that the electrically charged portions of the device cannot be reached by the hands should the cover be removed while the current is on. The inner or lower end of the annular wall 18 is provided with a grille 19 through which the insects may fall but which prevents contact of the fingers with the electrically charged parts of the device. The wall 18 may, if desired, be formed as an integral portion of the cover 3 and is composed of insulating material as is preferably but not necessarily, the grille 19.

It will also be noted that none of the electrodes are exposed within the inside surfaces of the opening 2 and passage 8 so that the possibility of a child or pet reaching within these openings and receiving a shock is completely avoided.

In herein describing the improved vermin trap and the operation of the same, I specifically refer to the vermin trapped thereby as "insects," thus implying that the vermin are for example, cockroaches, water-bugs, ants and the like. It will of course be understood that the use of the trap is not limited to the capture of such insects, for as previously herein stated, it may be also effectively used for trapping small animal pests of various kinds.

What I claim is:

1. A trap of the character described comprising, a receptacle, a removable cover therefor, said cover being provided with an uncovered aperture through which insects may pass to enter into the receptacle, said aperture being surrounded by an annular wall projecting into the receptacle and surrounded by the receptacle, spaced, annular electrically charged electrodes on the outer surface only of said wall and adapted to be bridged by the body of an insect only after it has completely passed over the inner surface of the wall and over the inner end of the wall and is proceeding over the outer face of the wall and toward the inside of the receptacle, said aperture in the cover constituting the sole means of entrance to the interior of the receptacle.

2. A trap of the character described comprising a receptacle, a cover fitted on top of the same, said cover being provided with an integrally formed annular wall directed downwardly into the receptacle, the cover being provided with a central opening surrounded by the wall, an annulus secured to the cover and directed into the receptacle and spaced from the wall and aligned with the opening whereby an insect entering through the opening will pass through the annulus, spaced pairs of annular electrodes mounted in the annulus and exposed at the outer face of the same, one pair of said electrodes being situated adjacent to the end of the annulus that is connected to the cover and the other pair situated adjacent to the free end of the annulus, the annulus being surrounded by the wall, said wall extending into the receptacle for a greater distance than the annulus, and a protective apertured cover member extending over the inner end of said wall.

3. A trap of the character described comprising, a receptacle, a cover therefor, said cover having an opening through which insects may enter, said opening being surrounded by an annular wall enclosed within the receptacle, said wall being provided on its exterior only with two pairs of spaced annular electrodes, one pair of said electrodes being located adjacent to the free inner end of said wall, one of the electrodes in said pair being indented in the wall and having its surface disposed below the surface of the wall, and means for connecting said electrodes to a source of electric current.

4. A trap of the character described comprising, a receptacle provided with side walls and a bottom, a cover for the top of said receptacle, said cover having an opening through which insects enter to reach the interior of the receptacle, said opening being surrounded by an annular wall extending downwardly from the cover and enclosed by but spaced from the walls and bottom of the receptacle, the cover closing the space between the outer surface of the annular wall and the walls of the receptacle, the annular wall being provided on its outer surface only with spaced annular electrodes, whereby said electrodes are disposed between the annular wall and the walls of the receptacle and are accessible only by entry through the opening in the cover and by passage around the inner free end of the annular wall, and means connecting said electrodes to a source of electric current.

5. A trap of the character described comprising, a receptacle, a removable cover therefor, said cover being provided with a central opening through which insects pass to enter into the receptacle, said aperture being surrounded by an annular wall located on the back of the cover and dependent into the receptacle and having an inner free end within the receptacle, spaced annular, electrically-charged electrodes on the outer face only of the annular wall and disposed between said annular wall and the walls of the receptacle, the space between the annular wall and the walls of the receptacle being closed by the cover, the electrodes being arranged in pairs whereby one pair will impart a shock to an insect when it is located on the outer face of the annular wall near the inner free end of the wall, and the second pair will impart a shock when the insect attempts to pass out of the aperture.

EVAN SHEA.